United States Patent [19]

Dean et al.

[11] Patent Number: 4,609,167
[45] Date of Patent: Sep. 2, 1986

[54] HELICOPTER CARGO RACK

[75] Inventors: Edward H. Dean; Burnley R. Doxey, both of Newport News, Va.

[73] Assignee: The United States of America as represented by the Secretary of the Army, Washington, D.C.

[21] Appl. No.: 668,456

[22] Filed: Nov. 5, 1984

[51] Int. Cl.⁴ .............................................. B64D 11/00
[52] U.S. Cl. .............................. 244/137 A; 244/118.1; 244/17.11
[58] Field of Search ............... 244/17.11, 118.1, 118.5, 244/137 R, 137 A, 137 P

[56] References Cited

U.S. PATENT DOCUMENTS

| | | | |
|---|---|---|---|
| 3,823,901 | 7/1974 | Holmes et al. | 244/118.1 |
| 3,904,155 | 9/1975 | Charis | 244/137 P |
| 4,178,032 | 12/1979 | Hone | 244/118.1 |
| 4,397,432 | 8/1983 | Resetar | 244/137 P |

Primary Examiner—Trygve M. Blix
Assistant Examiner—Rodney Corl
Attorney, Agent, or Firm—Anthony T. Lane; Robert P. Gibson; Norman L. Wilson, Jr.

[57] ABSTRACT

In the transportation by helicopter of specialized cargo externally, such as stokes litters, personnel carriers, auxilliary fuel tanks, gun mounts, and the like, it is frequently necessary to switch the carrying apparatus from one type of load to another. Normally, in order to provide for such external cargo a helicopter must be permanently altered to avoid the use of unreliable belts and straps. Permanent helicopter modifications are not totally acceptable in emergency situations. A helicopter cargo carrying apparatus is provided herein which is not subject to these objections. A pallet-like frame, upon which the load is secured, or which forms the base of the load carrying apparatus such as a platform or litter is provided.

3 Claims, 7 Drawing Figures

HELICOPTER CARGO RACK

BACKGROUND OF THE INVENTION

This invention relates to cargo carrying helicopters. More specifically the invention pertains to an external helicopter cargo rack, and to means for locking a cargo-carrier in place in the rack.

Normally in order to provide for external cargo a helicopter must be permanently altered. Such permanent alterations are made to avoid the use of unreliable belts and straps. Straps and belts are objectionable because loads held by them cannot be made sufficiently stable. Permanent helicopter modifications are not totally acceptable in emergency situations. A helicopter cargo carrying apparatus is provided herein which is not subject to these objections.

In the transportation by helicopter of specialized cargo externally, such as stokes litters, personnel carriers, auxilliary fuel tanks, gun mounts, and the like, it is frequently necessary to switch the carrying apparatus from one type of load to another. However, it is not feasible to have one cargo carrier which will meet all of these specialized load demands. This is particularly true in a military environment where time constraints are imposed, such as in search and rescue operations. Consequently, a means for switching from one type of external helicopter load to another is required. The cargo rack herein, together with a specific type of load carrier solves this problem.

An additional challenge facing one in a military environment is that such cargo carrying equipment must be used at night. In changing from one type of cargo to another at night it is not easy to install the new load, and it is especially difficult to lock it in place. This invention provides an external cargo carrying apparatus for helicopters which overcomes these difficulties.

SUMMARY OF THE INVENTION

Cargo is generally suspended in nets, by ropes or by rigid arms beneath the helicopter while being transported. This invention is based upon the use of a pallet-like frame, upon which the load is secured, or which forms the base of the load carrying apparatus such as a platform or litter. The supporting frame has at least a pair of tubes thereacross to be held by outwardly extending rigid arms. The cargo carrying attachment means includes a plurality of these rigid arms, capable of being attached to cargo attachment points in a helicopter fuselage and to extend outwardly substantially horizontally therefrom. Each arm is provided with, relative to the fuselage, an inner and an outer hook-shaped jaw whose recess is adapted to mate with a supporting frame tube. The inner and outer jaws, are spaced to receive the pair of similarly spaced supporting frame tubes, which are retained thereby, being removable only in a horizontal direction. A quick release mechanism is adapted to restrain this horizontal movement, locking the supporting frame in the arms.

DETAILED DESCRIPTION OF THE INVENTION

An advantage of the cargo carrying apparatus of this invention is that the frame base of the carrying device permits a helicopter to be used to carry specialized cargo and, in fact, virtually any cargo wherein its holder or carrying device has a frame base with two pipes, bars, or rods thereacross.

This can, perhaps, best be appreciated from a description of the invention in conjunction with drawings of preferred forms of the cargo carrying apparatus.

Figure 1:
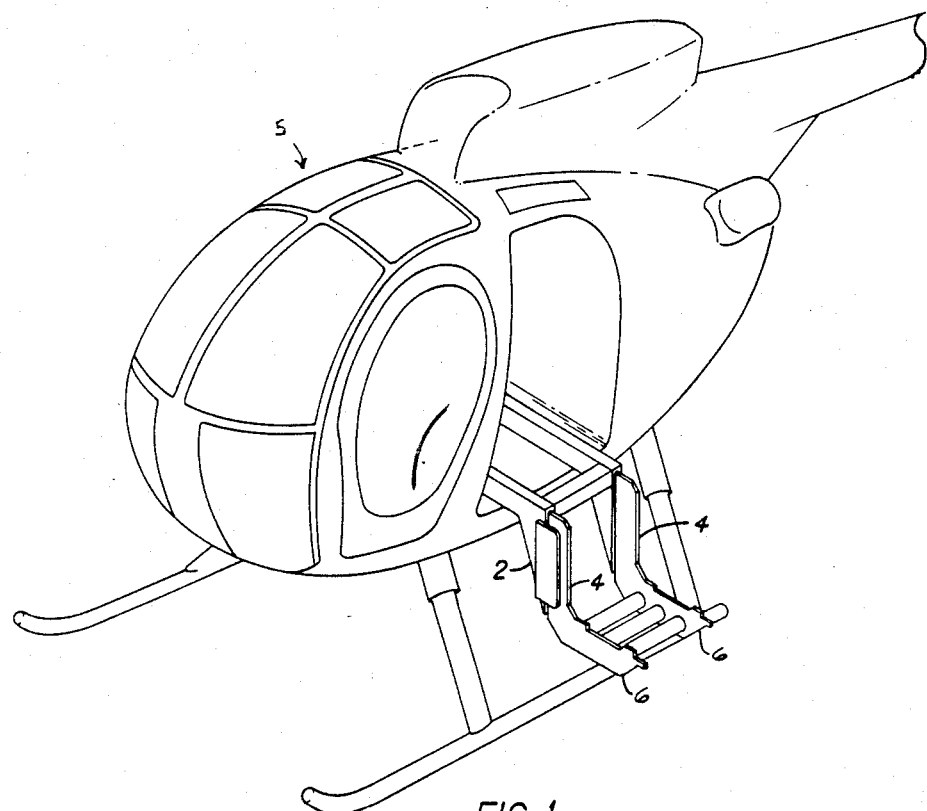
FIG. 1 is an elevation drawing, partially cut away, showing a helicopter with the cargo carrying apparatus atached.

Referring first to FIG. 1, load carrying apparatus 2 is adapted by means of frame 4 to be carried by a helicopter 5 through attachment at helicopter jack points and the cargo hook attachment point (not shown). It can be seen that in addition to framework 4 the load carry apparatus includes two substantially horizontal arms 6, adapted to carry a load supporting structure. The arms can be fabricated from steel or other strong plates whereas framework 4 will include rods, U or I beams.

Figure 2:
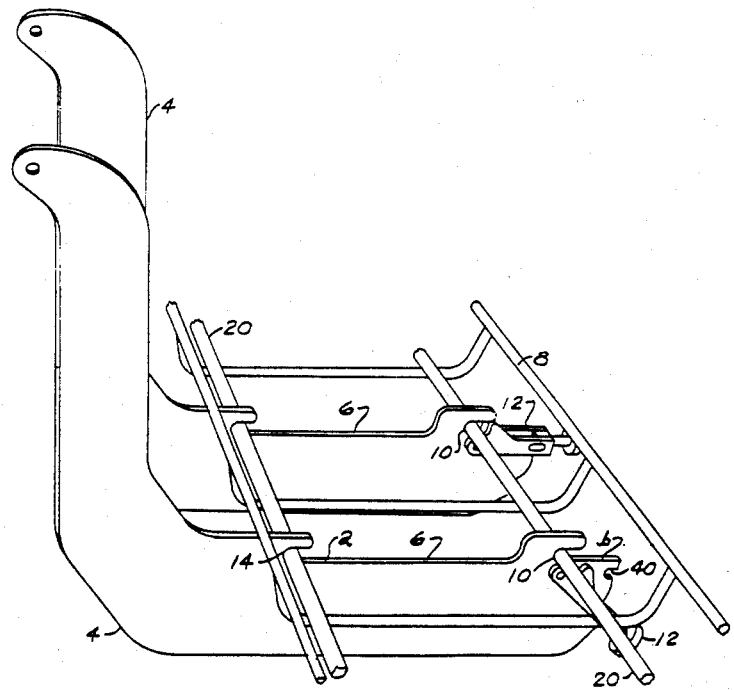
FIG. 2 is an isometric view of one form of the apparatus, showing the attachment thereto of a cargo holding device.
Figure 7:
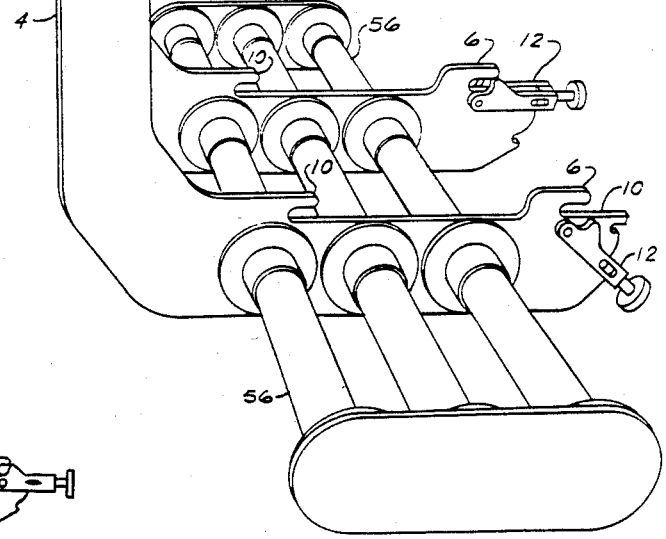

The arms are adapted with tube-retaining hooks or hook-shaped jaws 10, FIGS. 2 and 7, and for rapid loading and unloading, particularly at night, quick release mechanism 12, best shown in FIG. 7, is provided. Hooking jaw 10 is a recess adapted to mate with a tube in the base of load supporting structure 8 as seen in FIG. 2. By mating we mean that the curvature 14 of recess 10 and tube 20 curvature are coincident throughout, that is congruent. In other words, large hooking jaws will be used with large tubes and conversely.

It will be apparent from FIGS. 1 and 2 that hooking jaws 10 open outwardly for easy load insertion. The tubes 20 of load supporting structure 8 are rested on the arms 6 at points a and b (FIG. 2) and the structure is slid toward the helicopter back into jaws 10. Locking means preventing tubes 20 from being withdrawn in the opposite direction, away from the helicopter, secure the load for transport.

Inasmuch as loading and unloading speed is a factor, a quick release mechanism is preferred as the locking means. And since night loading is an important consideration, quick release mechanism 12 is particularly desirable. The features of this mechanism will be appreciated from FIGS. 3, 4 and 5.

Figure 3:
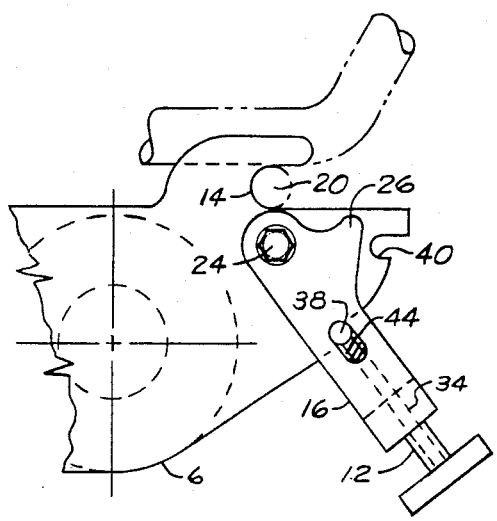
FIGS. 3 and 4 are close up side views of a quick release closure means.
Figure 4:
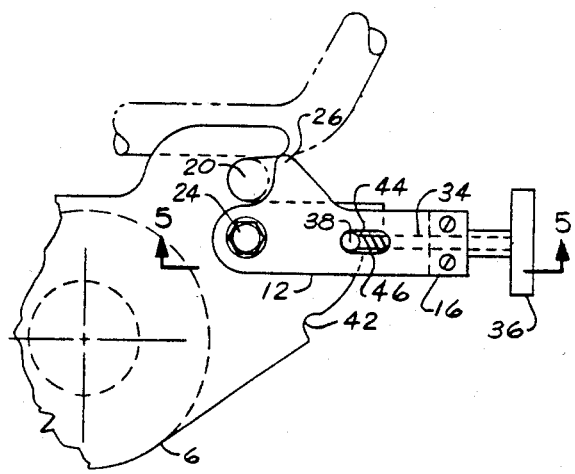
Figure 5:
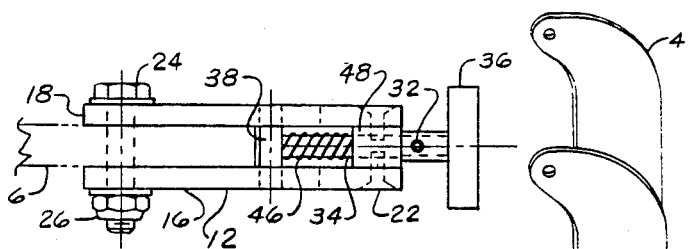
FIG. 5 is a cross-section taken along 5—5 of FIG. 4.

Since arms 6 are plate-like, as described, quick release mechanism 12 is bifurcated as shown in FIG. 5 to pass on each side of arm 6. Plates 16 and 18 form the main body of the quick release mechanism 12 which is held together by bolt 22. One end of the locking assembly is provided with a hole for bolt 24 which pivotally holds mechanism 12 to arm 6. Reference to FIGS. 3 and 4, also show that sides 16 and 18 of locking assembly or locking lever 12 are provided with a jog or shoulder 26. These protuberances 26 effectively close the opening of jaw 10, abutting tube 20. Desirably each knurl 26 will have an inner curvature mating with the outer curvature of the tube. Referring to FIGS. 3 and 4, it will be clear that locking lever 12 pivots from an open position (FIG. 3) to a closed position (FIG. 4) by axial or arcuate movement about bolt 24.

In addition to this pivotal movement blocking and unblocking the opening of jaw 10 means must be provided for locking the shoulder 26 in place. This means is shown in FIG. 5. The end of quick release lever member 12 away from pivot bolt 24 is provided with a housing 30 fitting over plates 16 and 18, held in place by pin 32. Passing through the end 31 of housing 30 is a retractable release rod 34 positioned between plates 16 and 18. A knob 36 is attached to its free end (FIG. 4).

Secured within release rod 34 and passing perpendicularly therethrough into frame plates 16 and 18 of lever member 12 is cross pin or lock rod 38. The ends of arms 6 are provided with reentrant slots 40 and 42, and cross pin 38 is capable of moving in and out of these two slots. An eye 44 in the side of member 16 (FIGS. 3 and 4) and in plate 18 (not shown) permits this movement. For use at night when visibility is limited biasing means are used to urge and hold cross pin 38 in either open position slot 42 or closed position slot 40. This is accomplished by a spring 46 which surrounds release rod 34. Spring 46 is compressed against cross pin 38 and an abutment 48 within mechanism 12 as shown in FIG. 5.

Turning now to the operation of the cargo carrying attachment means of this invention, by framework 4 (FIG. 2) arms 6 provided with spaced jaws 10 are removably attached to a helicopter as shown in FIG. 1. The load is then placed in a rack 8, or on a frame, having tubes 20 thereacross spaced to fit in jaws 10. The tubes are rested on surfaces a and b of arms 6 (FIG. 2), and, with quick release mechanism 12 in the open position shown in FIG. 3, the tubes are forced toward the helicopter into the jaws. By pulling knobs 36, further compressing spring 46, cross pin 38 is withdrawn from its open position slot 42 and the locking lever 12 is moved upwardly until biased cross pin 38 snaps into slot 40 to lock tubes 20 in place as seen in FIG. 4. To release the load rack a pull on knob 36 against spring 46 withdraws cross pin 38 from slot 40 so locking lever 12 is capable of pivotal movement to snap cross pin 38 into slot 42.

Figure 6:
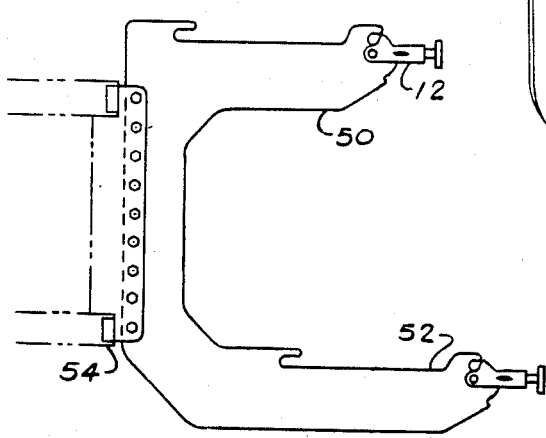
FIGS. 6 and 7 show additional embodiments of the invention.

Having been given the teachings of this invention, variations and ramifications will occur to those skilled in the art. As an example, whereas a pair of arms 6 are shown in FIGS. 1 and 2 three or more arms can be employed depending upon the weight of the load or the length of the helicopter. Moreover, stacked litters or other loads can be accommodated by having one set of arms with duplicate ends such as 50 and 52 as shown in FIG. 6. These will still be fastened to a frame work 54 for attachment to a helicopter.

Another embodiment is shown in FIG. 7. The arms 6 can be an integral part of another apparatus such as steps or platform 56, used to carry personnel or other objects. It will also be appreciated that the load carried by arms 6 can include such devices as motorcycle carriers, bicycletype seats, or gun mounts.

Whereas a quick release mechanism for night use is preferred, it will be understood that any of a variety of quick release closing means are available. Further, it is contemplated that shoulder 26 will press tightly against tube 20 to prevent front-to-back movement thereof, relative to the helicopter. The shoulder and jaws can be provided with gripping surfaces if desired or the tube can be enlarged on each side of arms 6. In addition, the shoulder 26 itself can be enlarged to provide more gripping or surface area.

Considering now minor changes, jaws 10 can face the opposite direction with the load being pulled instead of pushed in place. And the tubes 20 need not be the inner and outer tubes of a frame. They can be the first and second tubes, with the load frame extending beyond load arms 6. Square, rectangular or other shaped tubes or rods can also be employed, with jaws 10 correspondingly shaped. Such modifications are deemed to be within the scope of this invention.

What is claimed is:

1. A helicopter cargo carrier wherein a load is carried by a tubular supporting frame with at least a pair of tubes thereacross comprising the combination of a plurality of rigid arms capable of being attahed to cargo attachment points in a helicopter fuselage and having extensions extending outwardly substantially horizontally therefrom, each arm extension having, relative to the fuselage, an inner and an outer hook-shaped jaw with a recess adapted to mate with a supporting frame tube, the inner and outer jaws being spaced to receive the pair of similarly spaced supporting frame tubes to be retained thereby, said tubes of said supporting frame being removable only in a horizontal direction, and a quick release mechanism restraining said horizontal movement, locking the supporting frame in the arms.

2. The helicopter cargo carrier of claim 1 wherein the jaw recess and tube surfaces are curved, wherein the jaws curved recesses are directed outwardly and wherein the quick release mechanism locks the tube in the outer jaw to restrain the frame movement.

3. The helicopter cargo carrier of claim 2 wherein the quick release mechanism is a lever member pivotally connected at one end to the rigid arm, with a lever arm adapted for arcuate movement relative thereto adjacent and away from the outer jaw, blocking means integral with said lever arm preventing displacement of the outer tube when the lever arm is in a closed position across the jaw, and locking means securing the lever arm in either an open or closed position including a tubular axial passageway within the lever member, a manually actuatable rod slideably disposed therin, a cross pin extending perpendicularly through the rod end adjacent the pivotal connection, and a release knob on the rod end away from the pivotal connection, in combination with reentrant slots in the rigid arm and spring means for biasing the cross pin into engagement with a reentrant slot to lock the lever arm in either an open or closed position.

* * * * *